United States Patent
Kumasaka et al.

(10) Patent No.: US 11,794,840 B2
(45) Date of Patent: Oct. 24, 2023

(54) STRADDLE TYPE VEHICLE

(71) Applicant: HONDA MOTOR CO., LTD., Tokyo (JP)

(72) Inventors: Tsuyoshi Kumasaka, Wako (JP); Yoshiyuki Kuroba, Wako (JP); Kiyoshi Katagiri, Wako (JP); Hiroshi Maeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 691 days.

(21) Appl. No.: 16/988,053

(22) Filed: Aug. 7, 2020

(65) Prior Publication Data
US 2020/0361554 A1 Nov. 19, 2020

Related U.S. Application Data

(63) Continuation of application No. PCT/JP2018/007739, filed on Mar. 1, 2018.

(51) Int. Cl.
| | |
|---|---|
| B62J 25/08 | (2020.01) |
| B62J 1/28 | (2006.01) |
| B62J 27/00 | (2020.01) |
| B62J 50/22 | (2020.01) |
| B62J 45/41 | (2020.01) |
| B62J 45/42 | (2020.01) |

(52) U.S. Cl.
CPC .............. *B62J 25/08* (2020.02); *B62J 1/28* (2013.01); *B62J 27/00* (2013.01); *B62J 45/41* (2020.02); *B62J 45/42* (2020.02); *B62J 50/22* (2020.02)

(58) Field of Classification Search
CPC ..... B60J 1/28; B60J 45/41; B60J 45/42; B60J 45/422; B60J 25/08; B60J 27/00
USPC ........................................................ 180/219
See application file for complete search history.

(56) References Cited

U.S. PATENT DOCUMENTS

| | | | |
|---|---|---|---|
| 9,457,753 B2 | 10/2016 | Freienstein et al. | |
| 10,741,082 B2* | 8/2020 | Kurata | B60K 35/00 |
| 2014/0167386 A1* | 6/2014 | Tako | B62J 6/045 |
| | | | 280/288 |
| 2015/0228066 A1* | 8/2015 | Farb | G06V 20/58 |
| | | | 348/148 |
| 2015/0329072 A1 | 11/2015 | Freienstein et al. | |
| 2016/0214674 A1* | 7/2016 | Mizuta | B62J 1/12 |

(Continued)

FOREIGN PATENT DOCUMENTS

| | | | | |
|---|---|---|---|---|
| CN | 107479056 A | * | 12/2017 | |
| EP | 1818247 A2 | * | 8/2007 | B62J 1/28 |
| JP | H07007628 U | | 2/1995 | |

(Continued)

OTHER PUBLICATIONS

CN-107479056-A machine translation (Year: 2017).*

(Continued)

*Primary Examiner* — Amy R Weisberg
*Assistant Examiner* — Kevin P Weldon
(74) *Attorney, Agent, or Firm* — Thomas | Horstemeyer, LLP

(57) ABSTRACT

There is provided with a straddle type vehicle. A grip is gripped by a passenger. A sensing device detects an obstacle around the vehicle by using an ultrasonic wave. An electric harness is connected to the sensing device is arranged in the grip is connected to the sensing device through an interior of the grip.

7 Claims, 8 Drawing Sheets

(56) References Cited

U.S. PATENT DOCUMENTS

2017/0008585 A1\* 1/2017 Wada .................. B62J 25/08
2018/0229645 A1\* 8/2018 Hara .................. B60Q 1/0023

FOREIGN PATENT DOCUMENTS

| JP | 2008100596 A | 5/2008 | |
|----|----|----|----|
| JP | 2016503503 A | 2/2016 | |
| JP | 2017039488 A | 2/2017 | |
| JP | 2017173908 A | 9/2017 | |
| WO | 2014079697 A1 | 5/2014 | |
| WO | WO-2016046775 A1 \* | 3/2016 | ............ B60N 2/002 |
| WO | 2019167220 A1 | 9/2019 | |

OTHER PUBLICATIONS

JP-2017-173908 machine translation (Year: 2017).\*
JP 2008-1-596 machine translation (Year: 2008).\*
International Search Report for PCT/JP2018/007739 dated May 15, 2018.

\* cited by examiner

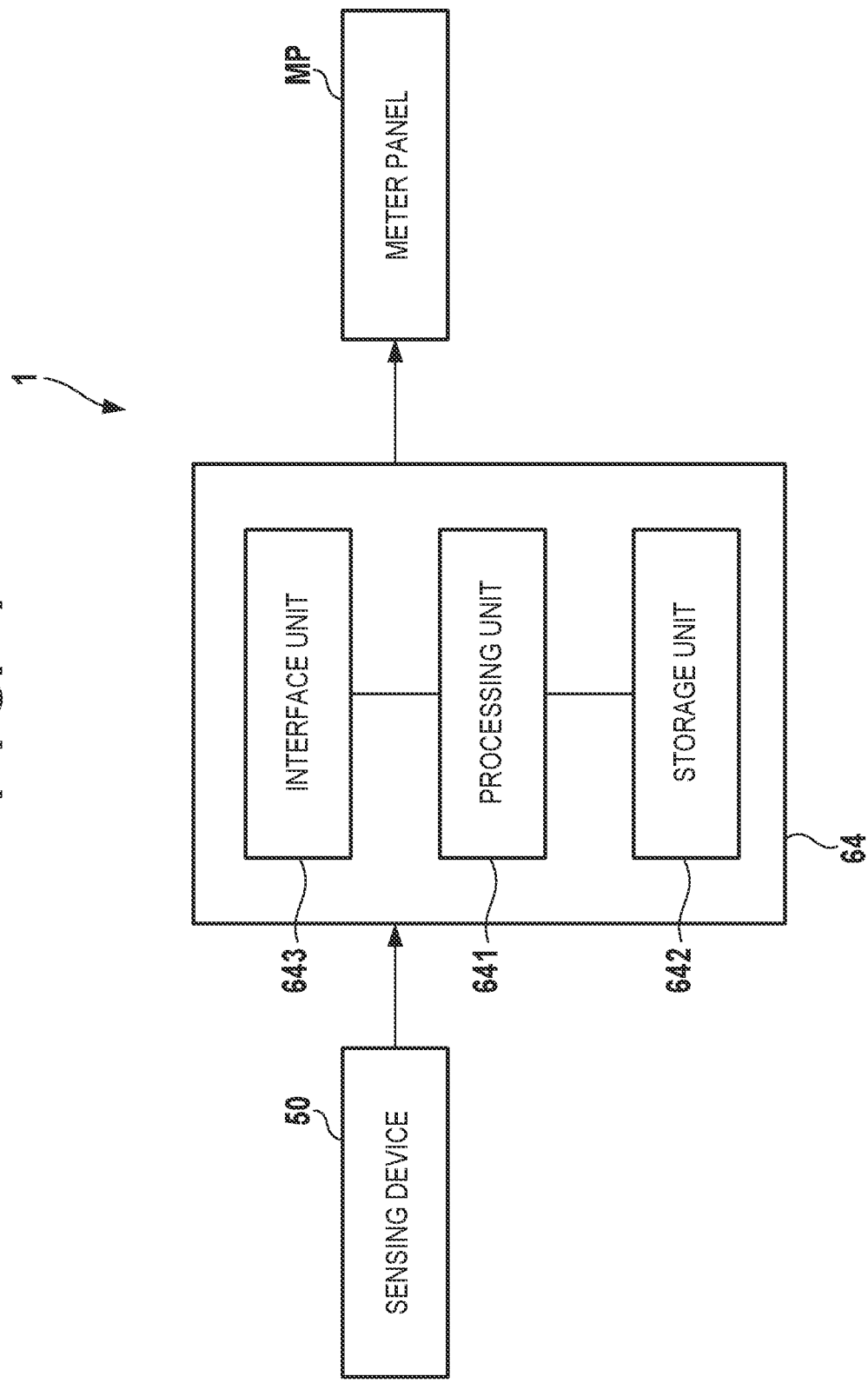

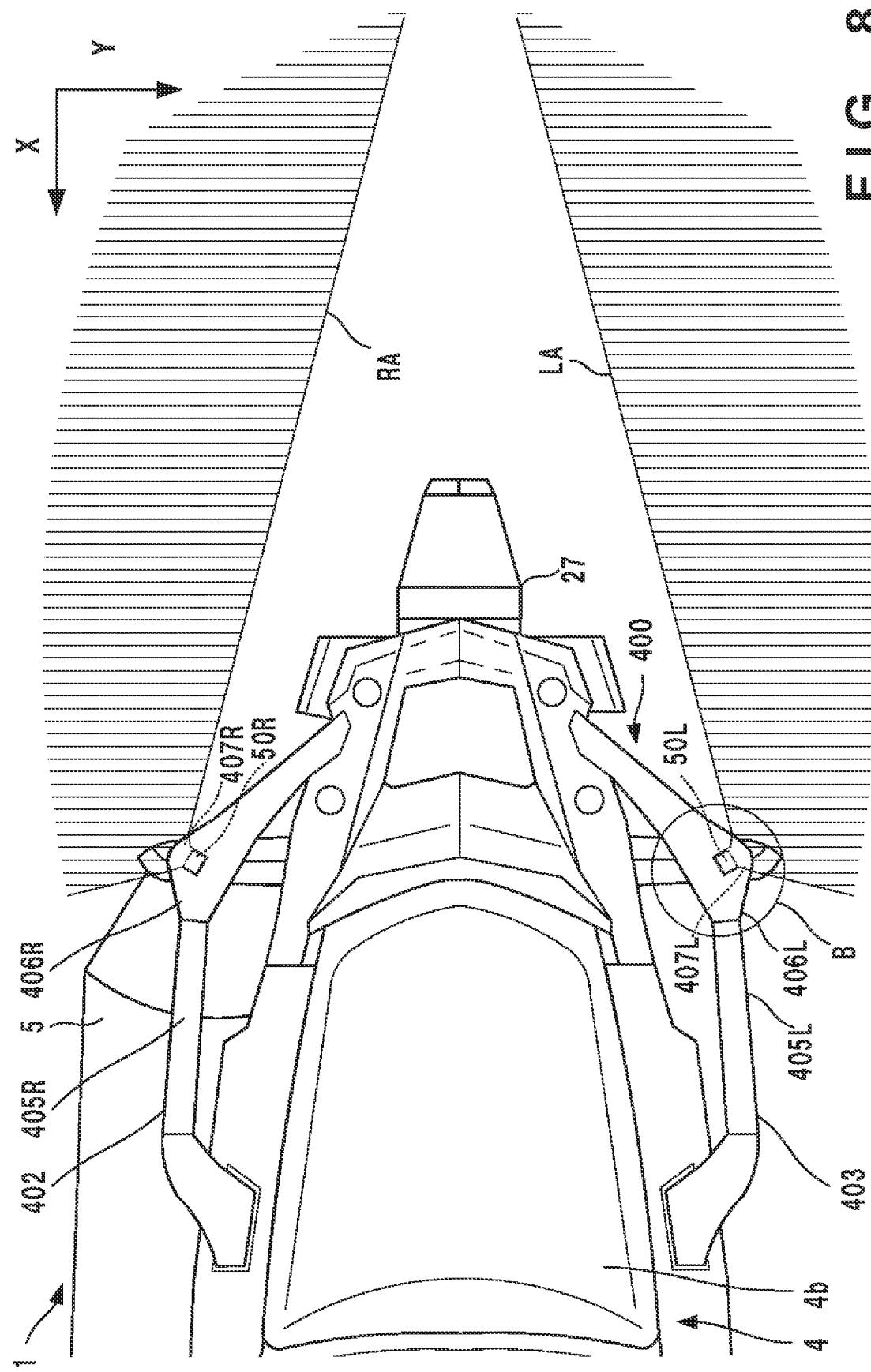

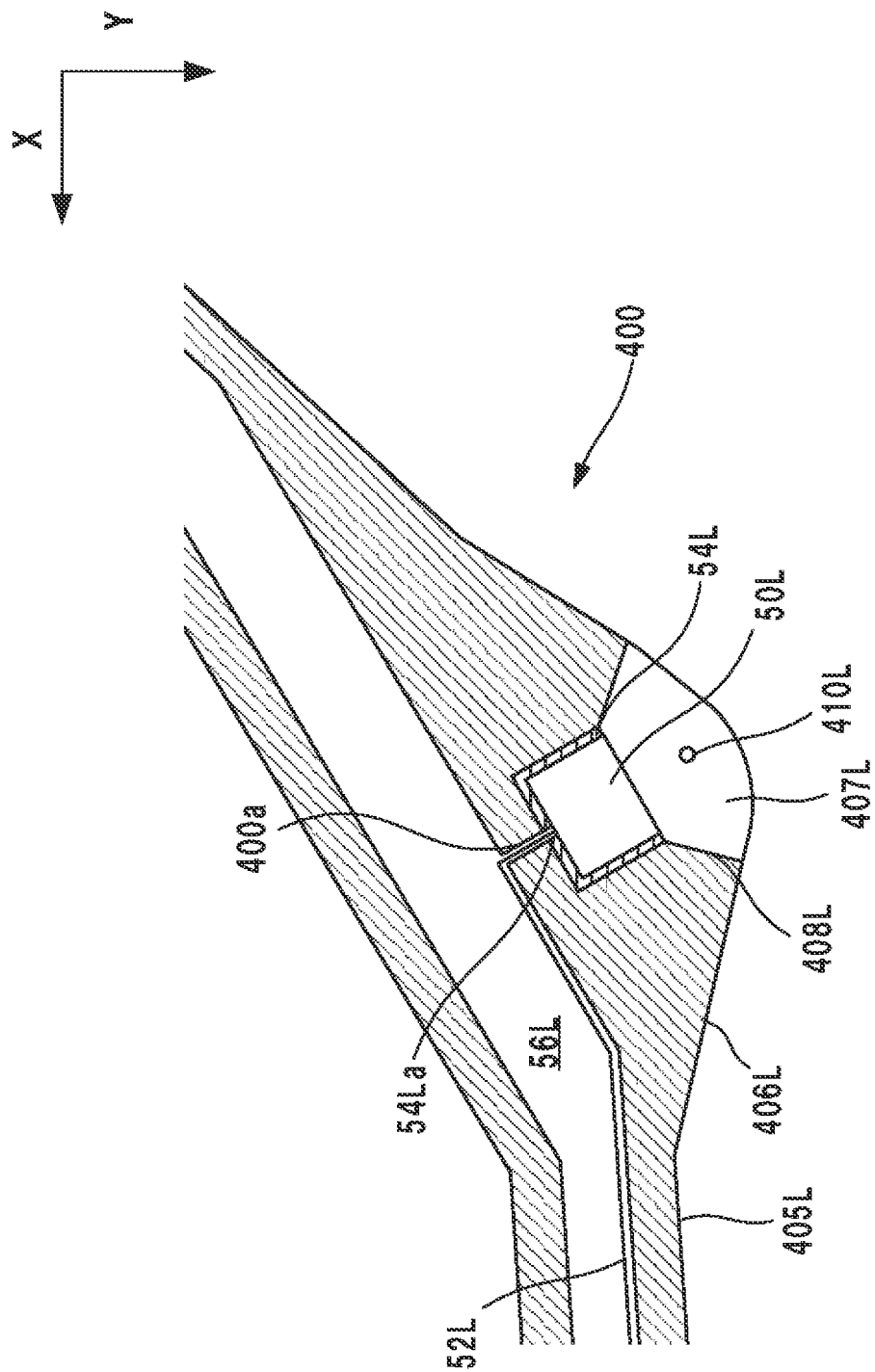

STRADDLE TYPE VEHICLE

CROSS-REFERENCE TO RELATED APPLICATION(S)

This application is a continuation of International Patent Application No. PCT/JP2018/007739 filed on Mar. 1, 2018, the entire disclosures of which is incorporated herein by reference.

TECHNICAL FIELD

The present invention relates to a straddle type vehicle.

BACKGROUND ART

A straddle type vehicle including a sensing device for detecting obstacles around the vehicle is known as a straddle type vehicle including a sensing device on a side of a vehicle main body (for example, PTL 1).

CITATION LIST

Patent Literature

PTL 1: Japanese Patent Laid-Open No. 2016-503503

SUMMARY OF INVENTION

Technical Problem

When the sensing device detects an obstacle around a vehicle by using an ultrasonic wave, the properties of the device sometimes decrease the detection accuracy due to a vibration or shock.

An embodiment of the present invention provides a straddle type vehicle capable of improving the detection accuracy of the sensing device.

Solution to Problem

The invention of claim 1 is a straddle type vehicle comprising a grip to be gripped by a passenger, a sensing device configured to detect an obstacle around the vehicle by using an ultrasonic wave, and an electric harness to be connected to the sensing device, wherein the sensing device is arranged in the grip, and wherein the electric harness is connected to the sensing device through an interior of the grip.

According to the invention of claim 2, the sensing device is installed in a rear end of the grip in a vehicle longitudinal direction.

According to the invention of claim 3, the straddle type vehicle further comprises a seat on which the passenger sits, wherein the grip includes a rear portion arranged behind a rear end of the seat in the vehicle longitudinal direction, and the sensing device is arranged in the rear portion.

According to the invention of claim 4, the grip includes a recess that opens backward or sideward of the vehicle, and at least a part of the sensing device is arranged in the recess.

According to the invention of claim 5, at least a part of an inner wall of the recess extends backward more than the sensing device in the vehicle longitudinal direction.

According to the invention of claim 6, the inner wall has an inclined portion that inclines downward toward the opening of the recess.

According to the invention of claim 7, a drain hole is formed in a lower portion of the inner wall.

According to the invention of claim 8, the grip includes a first region, and a second region having a shape different from that of the first region, and the sensing device is arranged in the second region.

According to the invention of claim 9, the grip gradually thickens from the front part to the position where the sensing device is installed in the vehicle longitudinal direction.

According to the invention of claim 10, the straddle type vehicle further includes, determining unit configured to determine whether an obstacle exists within a predetermined distance, from a detection result of the sensing device, and notifying unit configured to notify a driver that the determining unit determines that the obstacle exists within the predetermined distance.

Advantageous Effects of Invention

According to the invention of claim 1, the sensing device is installed in the grip having rigidity higher than that of, for example, the cowl or the fender, and this suppresses amplification of the vehicle vibration to be applied to the sensing device. Therefore, damage to the sensing device can be prevented. Also, according to the invention of claim 1, the electric harness can be protected because it is not exposed to the outside.

According to the invention of claim 2, the sensing device is installed in the rear end. Since this reduces obstacles to detection, rear detection can easily be performed. Also, the sensing device is installed in the rear end of the grip that is very unlikely to be gripped by the passenger. Therefore, it is possible to prevent the emission of an ultrasonic wave from being blocked by, for example, the hand or the cloth of the passenger.

According to the invention of claim 3, the sensing device is arranged behind the seat that is very unlikely to be gripped by the passenger. This makes it possible to prevent the emission of an ultrasonic wave from being blocked by, for example, the hand or the cloth of the passenger.

According to the invention of claim 4, the sensing device can be protected because it is not largely exposed.

According to the invention of claim 5, the inner wall prevents an ultrasonic wave from being emitted outside the target detection range, so the ultrasonic wave can be emitted to the target detection range. Also, since the inner wall decreases the emission angle of the ultrasonic wave, the ultrasonic wave is amplified, and the sensing performance can be improved.

According to the invention of claim 6, the inner wall inclines downward toward the opening, so the drainage of the inner wall can be improved.

According to the invention of claim 7, water inside the inner wall flows through the drain hole, so the drainage of the inner wall can be improved.

According to the invention of claim 8, the passenger can easily recognize by the sense of touch that he or she is gripping a portion including the sensing device. This makes it possible to encourage the passenger to regrip a position spaced apart from the sensing device.

According to the invention of claim 9, the grip gradually thickens toward the sensing device, so the passenger can easily grip a position far from the sensing device. This makes it possible to prevent the hand of the passenger from covering the sensing device more effectively.

According to the invention of claim 10, if the detection range of the sensing device is blocked by, for example, the hand or the cloth of the passenger, the driver is notified of this information. Therefore, the driver can encourage the passenger not to block the detection range by, for example, the hand or the cloth.

BRIEF DESCRIPTION OF DRAWINGS

FIG. 7 is a block diagram of a control system of the straddle type vehicle according to the embodiment;

FIG. 8 is a plan view showing the layout of sensing devices according to another embodiment; and FIG. 9 is a sectional view of a region B shown in FIG. 8, and shows the region B from above.

DESCRIPTION OF EMBODIMENTS

A straddle type vehicle according to an embodiment of the present invention will be explained below with reference to the accompanying drawings. In each drawing, arrows X, Y, and Z indicate directions perpendicular to each other. The X direction indicates the front-and-rear direction of the straddle type vehicle, the Y direction indicates the vehicle width direction (left-and-right direction) of the straddle type vehicle, and the Z direction indicates the vertical direction. The front or rear in the front-and-rear direction of the straddle type vehicle will simply be called the front or rear in some cases. Also, the inside or outside in the vehicle width direction (left-and-right direction) of the straddle type vehicle will simply be called the inside or outside in some cases. Furthermore, when a pair of left and right parts are explained by taking one of them as an example, the other part is not shown or an explanation thereof will be omitted in some cases.

<Outline of Straddle Type Vehicle>

Figure 1:
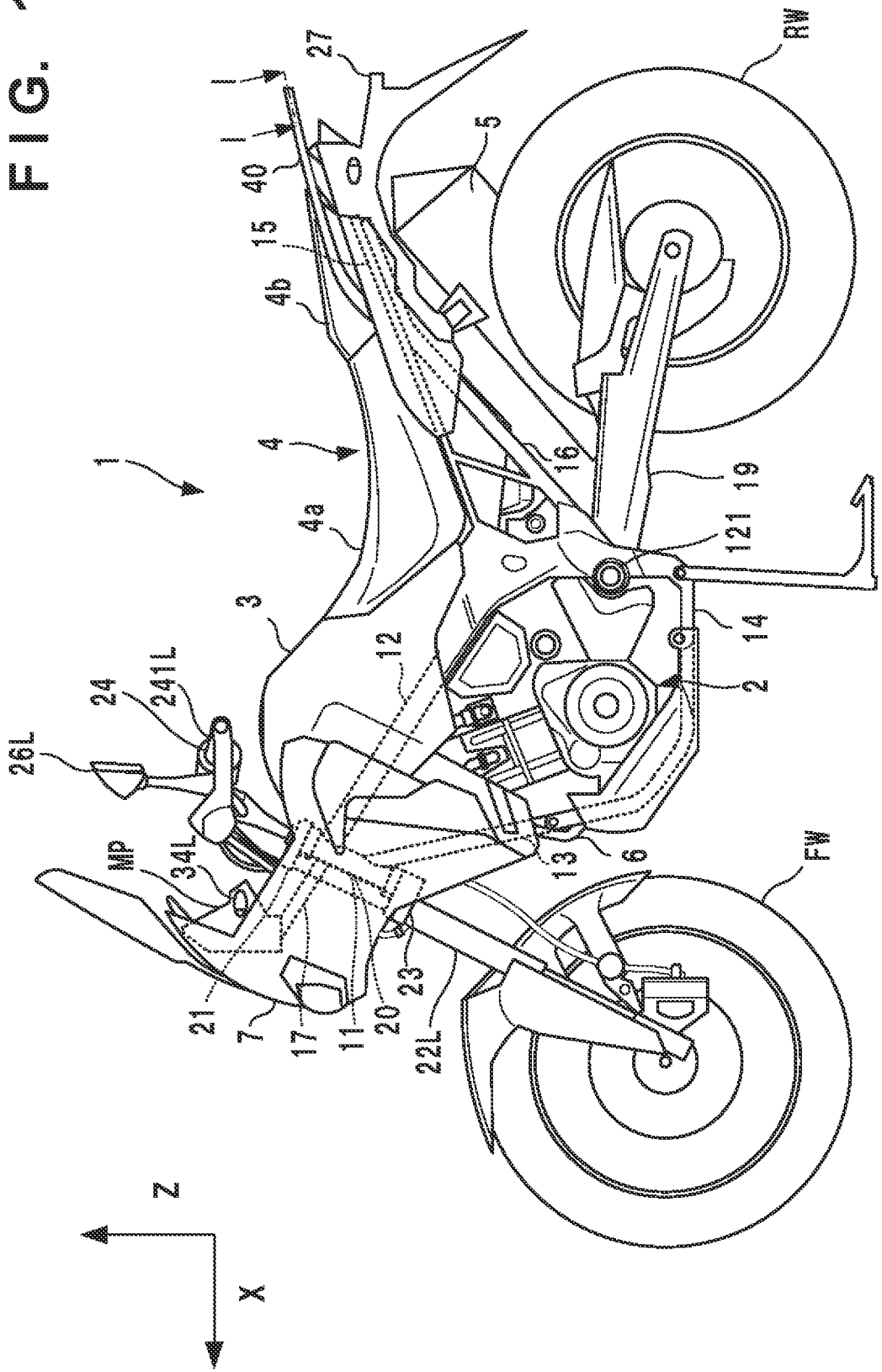
FIG. 1 is a left side view of a straddle type vehicle according to an embodiment.
Figure 2:
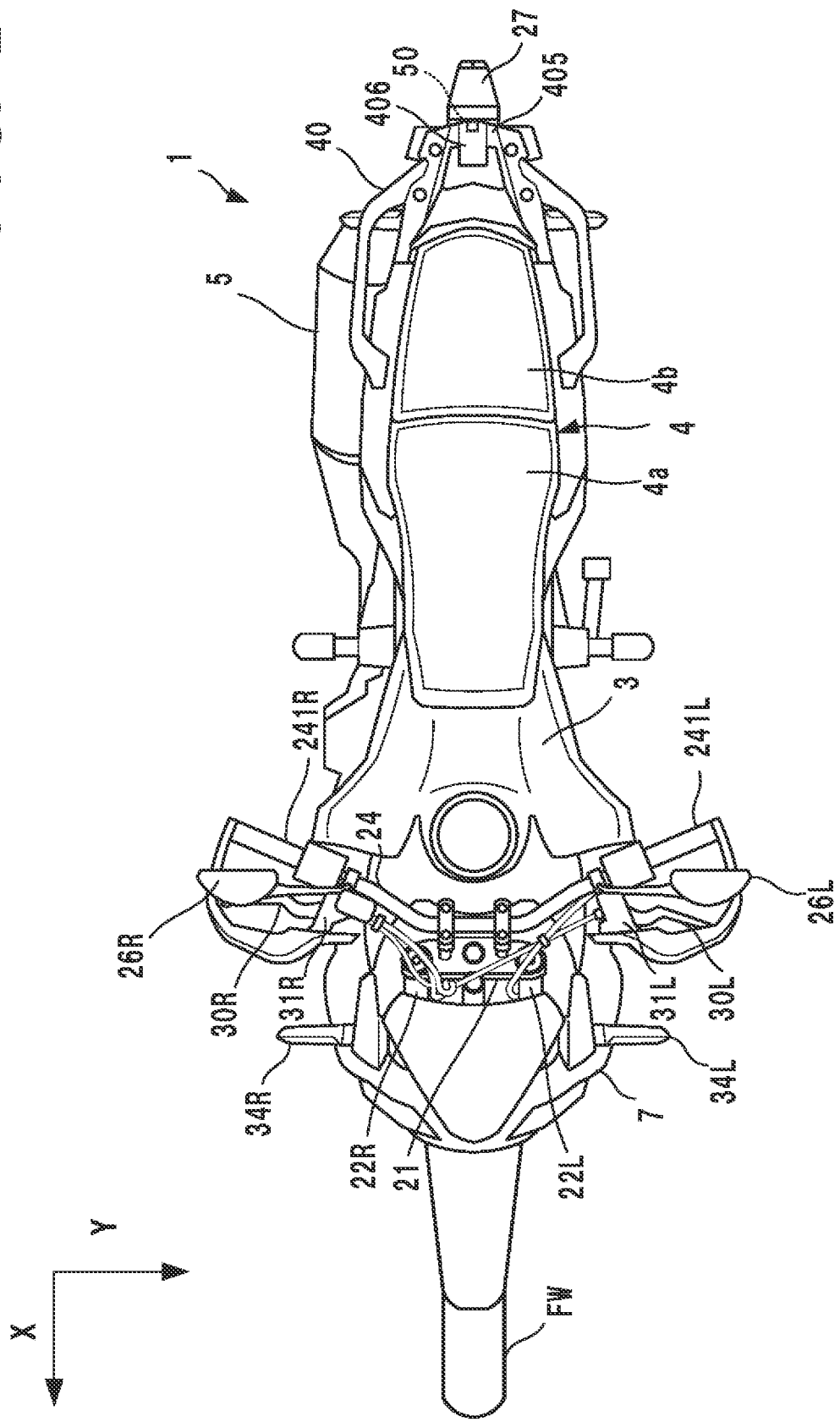
FIG. 2 is a plan view of the straddle type vehicle shown in FIG. 1.

FIG. 1 is a left side view of a straddle type vehicle 1 according to the embodiment of the present invention. FIG. 2 is a plan view of the straddle type vehicle 1. The straddle type vehicle 1 is an off-road motorcycle. However, the present invention is applicable to various kinds of straddle type vehicles including motorcycles of other forms. The present invention also applicable to a vehicle including an internal-combustion engine as a driving source, and an electric vehicle including a motor as a driving source. In the following description, the straddle type vehicle 1 will sometimes be called the vehicle 1.

As a vehicle body frame, the vehicle 1 includes a head pipe 11 formed in the front part of the vehicle, a pair of left and right main frames 12, a down frame 13, a pair of left and right lower frames 14, and an extending portion 17. Each of the head pipe 11 and the down frame 13 is a single member formed along the center of the vehicle body.

The main frames 12, the down frame 13, and the lower frames 14 are connected into the form of a loop, and a power unit 2 is arranged inside a region surrounded them. The power unit 2 includes an engine and a transmission. An exhaust pipe 6 for guiding the exhaust gas of the engine to an exhaust muffler 5 is formed in front of the power unit 2.

The main frames 12 have a portion that branches into left and side parts, are attached to the upper portion of the head pipe 11, and obliquely extend downward and backward by curving to the left and right above the power unit 2. The down frame 13 is attached to the lower portion of the head pipe 11, and extends downward in front of the power unit 2 by linearly and obliquely descending in the center of the vehicle, and the lower end portion thereof is connected to the front end portions of the pair of left and right lower frames 14. The pair of left and right lower arms 14 curve from the front lower side portions of the power unit 2 to below the power unit 2 and almost linearly extend backward, and the rear end portions thereof are connected to the lower end portions of the pair of left and right main frames 12.

A fuel tank 3 supported by the main frames 12 is arranged above the power unit 2. A seat 4 is arranged immediately behind the fuel tank 3. The seat 4 includes a seat front part 4a on which a driver sits and a seat rear part 4b on which a passenger sits, and is supported on a pair of left and right seat frames 15. The pair of left and right seat frames 15 include front ends attached to the pair of left and right main frames 12, and are extended backward. A rear fender 27 for preventing splash of mud or rainwater by a rear wheel RW is supported behind the seat frames 15. A pair of left and right rear frames 16 are connected to the seat frames 15 and the main frames 12.

A grip 40 to be gripped by the passenger is formed backward from the side portions of the seat rear part 4b. The grip 40 is supported by the seat frames 15. A sensing device 50 (to be described later) is installed at the rear end of the grip 40. Note that carriers (not shown) for storing baggage and the like can be attached to the side portions and the rear end of the grip 40. The grip 40 is required to have stability when the passenger grips the grip 40 and strength against the load when the carriers are attached. Therefore, the grip 40 is formed stronger than, for example, the rear fender 27 positioned below the grip 40.

A steering stem 20 is pivotally supported by the head pipe 11, and a top bridge 21 is attached to the upper end portion of the steering stem 20. A bottom bridge 23 is attached to the lower end portion of the steering stem 20.

A pair of left and right front forks 22L and 22R are supported by fork insertion holes (not shown) in the left and right end portions of the top bridge 21. The pair of front forks 22L and 22R are also supported by the bottom bridge 23.

The pair of front forks 22L and 22R will also be called front forks 22 (this applies to all pairs of left and right members hereinafter). A front wheel FW is rotatably supported by the lower end portions of the front forks 22, and steered by a handle bar 24 attached to the top bridge 21. Grips 241L and 241R to be gripped by the driver are formed at the left and right end portions of the handle bar 24. In addition, brake levers 30L and 30R, and brake master cylinders 31L and 31R interconnected to the brake levers 30L and 30R, are formed adjacent to the grips 241L and 241R. Furthermore, mirrors 26L and 26R extending outside in the vehicle width direction are formed inside the grips 241L and 241R of the handle bar 24.

The extending portion 17 is so formed as to extend forward from the head pipe 11, and supports a meter panel MP. The meter panel MP is a display device that displays various kinds of information, for example, the vehicle statuses such as the vehicle speed and the engine speed, and notification to the driver. In addition, a front cowl 7 is formed from the front part to the side parts of the meter panel MP, the front forks 22, and the like, so as to cover these members. Furthermore, bar winkers 34L and 34R are so formed as to project outside in the vehicle width direction from the sides of the meter panel MP.

The front end portion of a rear swing arm 19 is swingably supported by the main frames 12 by using a pivot shaft 121. The rear wheel RW is supported by the rear end portion of the rear swing arm 19, and rotated by a chain (not shown) wound around a drive sprocket (not shown) of the power unit 2 and a driven sprocket (not shown) of the rear wheel RW.

<Details of Sensing Device>

Figure 3:
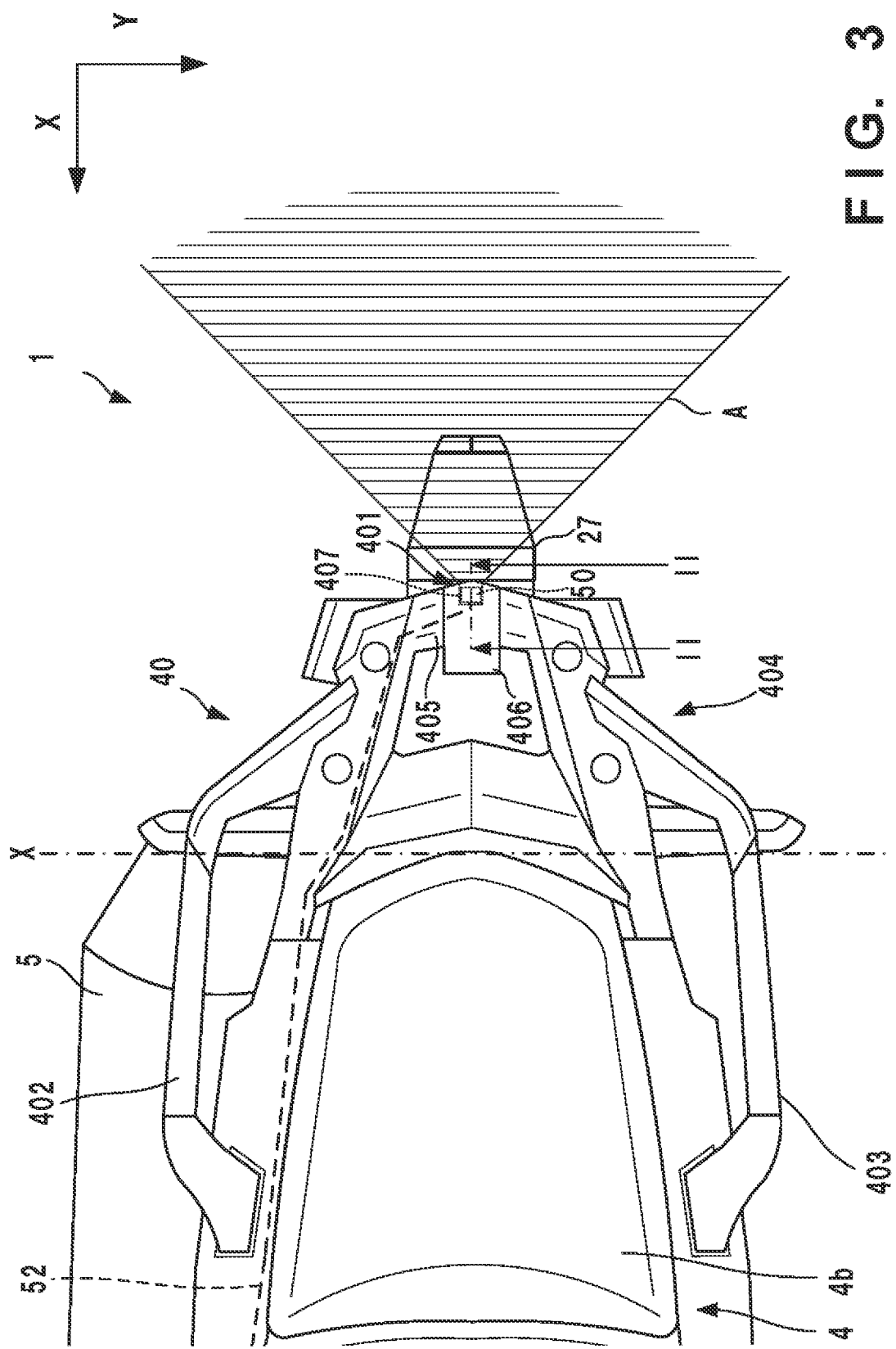
FIG. 3 is a plan view of the straddle type vehicle shown in FIG. 1, and shows the rear part of the vehicle in an enlarged scale.

Details of the sensing device 50 according to this embodiment will be explained below. FIG. 3 is a plan view of the straddle type vehicle 1, and shows the rear part of the vehicle in an enlarged scale.

The sensing device 50 is installed in a rear end 401 of the grip 40. In this embodiment, the rear end 401 has a recess 407 that opens backward, and the sensing device 50 is inserted into the recess 407. The sensing device 50 can detect obstacles around the vehicle 1, and is an integrated transmitter/receiver type ultrasonic sensor (sonar) in this embodiment.

As shown in FIG. 3, the sensing device 50 detects obstacles such as nearby vehicles in a detection range A behind the vehicle 1. The rear end 401 of the grip 40 is higher than the rear fender 27 and the like. When installing the sensing device 50 for detecting obstacles behind the vehicle, therefore, the sensing device 50 is not easily influenced by noise produced by the reflection of ultrasonic waves from the road surface, so the detection accuracy can be improved.

The grip 40 includes a right side part 402 positioned on the right side of the seat rear part 4b on which the passenger sits, a left side part 403 positioned on the left side, and a rear part 404. In this embodiment, the rear end (an alternate long and short dashed line X in FIG. 3) of the seat rear part 4b is the basis, and that portion of the grip 40, which is positioned after this rear end is given as the rear part 404. In this embodiment, the rear part 404 is so formed as to connect the right side part 402 and the left side part 403. However, the rear part 404 is not limited to this arrangement that connects the right side part 402 and the left side part 403, and it is also possible to adopt an arrangement in which a pair of left and right rear parts are formed from the rear ends of the right side part 402 and the left side part 403.

The sensing device 50 is installed in the rear end 401 of the grip 40 in this embodiment, but the sensing device 50 may also be installed in another position of the rear part 404. Also, the number of the sensing device 50 to be installed is not limited to 1, and it is also possible to adopt an arrangement in which two or more devices are installed.

The grip 40 includes a first region 405 and a second region 406 having a shape different from that of the first region 405, and the sensing device 50 is installed in the second region 406. In this embodiment, the second region 406 is made longer than the first region 405 in the extending direction. Accordingly, the passenger hardly grips the second region and can recognize the gripped portion by the sense of touch. This makes it possible to prevent the sensing device 50 from being closed with, for example, the hand or the cloth of the passenger. Note that as another example of the different shape, an arrangement in which the shape gradually thickens toward the sensing device can also be adopted. It is further possible to form a flange or one or a plurality of projections in that portion of the second region 406, which is close to the boundary between the first and second regions 405 and 406.

Figure 4:
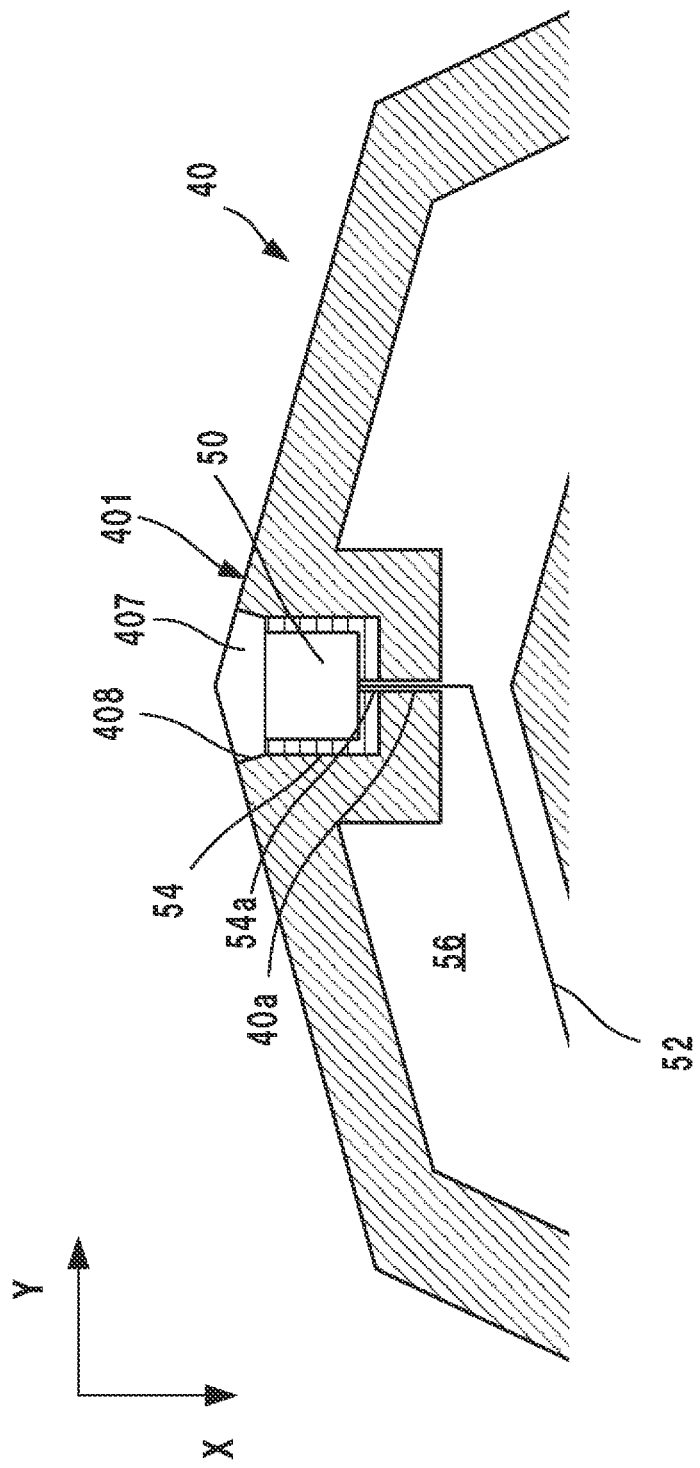
FIG. 4 is a sectional view taken along a line I-I in FIG. 1.
Figure 5:
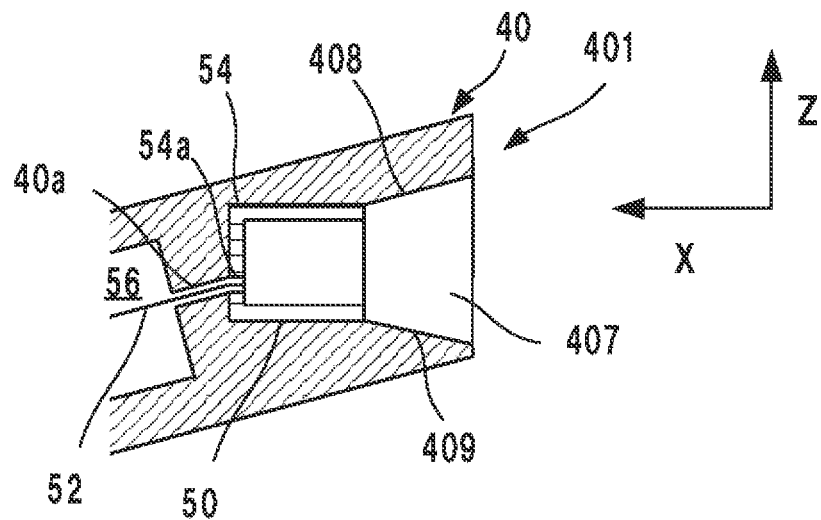
FIG. 5 is a sectional view taken along a line II-II in FIG. 3.
Figure 6:
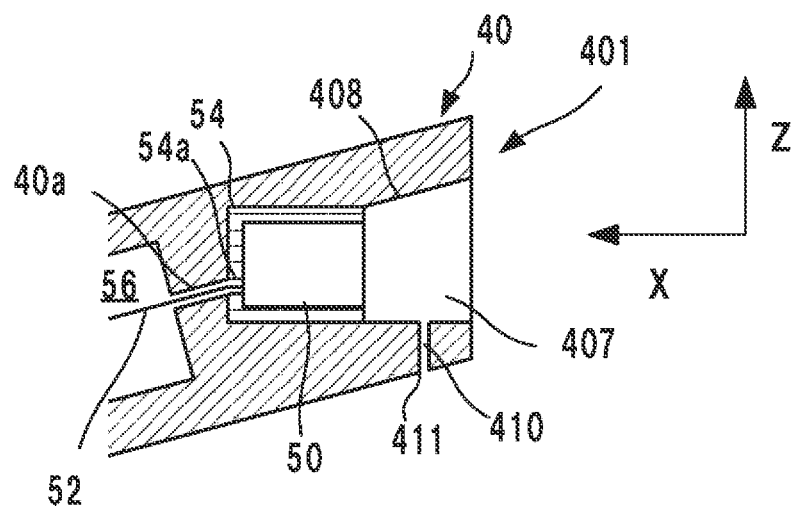
FIG. 6 is a view showing a modification of FIG. 5.

FIG. 4 is a sectional view taken along a line I-I in FIG. 1, and shows the way the sensing device 50 is mounted. FIG. 5 is a sectional view taken along a line II-II in FIG. 3. FIG. 6 shows a modification of FIG. 5. The grip 40 has the recess 407 that opens backward, and the sensing device 50 is installed in the recess 407. Although the whole sensing device 50 is installed in the recess 407 in this embodiment, at least a part of the sensing device 50 may also be installed in the recess. In addition, at least a part of an inner wall 408 of the recess 407 may also extend backward from the sensing device 50.

When installing the sensing device 50 in the recess 407, a vibration damping member 54, for example, an elastic member such as antivibration rubber can be interposed. By interposing the vibration damping member 54, it is possible to suppress a vibration to be transmitted to the sensing device 50 and prevent a decrease in detection accuracy of the sensing device 50.

The vehicle 1 further includes an electric harness 52 for connecting the sensing device 50 to a control unit 64 (to be described later). The electric harness 52 extends from the sensing device 50 to the control unit 64 through the interior of the grip 40. The grip 40 is formed by using, for example, a metal member or a resin member, so as to include a hollow 56 inside. Also, holes 40a and 54a are formed in the grip 40 and the vibration damping member 54 so as to connect to the hollow 56 from the recess 407. The electric harness 52 connected to the sensing device 50 extends to the hollow 56 through the holes 40a and 54a. Since the electric harness 52 extends inside the grip 40 as described above, the electric harness 52 can be protected without being exposed to the outside.

Referring to FIG. 5, the inner wall 408 includes an inclined portion 409 that inclines downward toward the opening of the recess 407. By forming the inclined portion 409 that inclines downward on the inner wall 408, the drainage of the recess 407 can be improved when, for example, rain falls. Also, a drain hole 410 can be formed in the inner wall 408 as shown in FIG. 6. By forming the drain hole 410, the drainage of the recess 407 can be improved because water inside the inner wall 408 flows through the drain hole 410. In this embodiment, the drain hole 410 is a through hole extending downward through the inner wall 408. However, an exit 411 of the drain hole 410 may also be shifted to another position such as the outside in the vehicle width direction. Note that it is also possible to adopt an arrangement including both the inclined portion 409 and the drain hole 410.

FIG. 7 is a block diagram of the control system of the vehicle 1, particularly, a block diagram of the control unit 64 for controlling the sensing device 50 and the meter panel MP. The control unit 64 causes the meter panel MP to also function as a notification unit that displays information of the periphery of the vehicle, and controls the display based on the detection result of the sensing device 50. The control unit 64 includes a processing unit 641, a storage unit 642 such as a RAM or a ROM, and an interface unit 643 for relaying exchange of signals between an external device and the processing unit 641. The processing unit 641 is a processor such as a CPU and executes programs stored in the storage unit 642. The storage unit 642 stores the programs to be executed by the processing unit 641, and various kinds of data. The interface unit 643 receives the detection result from the sensing device 50 via a signal processing circuit (not shown).

An example of processing to be executed by the processing unit 641 will be explained. As basic processing, the processing unit 641 determines the presence/absence of an obstacle such as a nearby vehicle based on the input detection result from the sensing device 50. If the processing unit 641 determines that there is an obstacle in the periphery, the processing unit 641 notifies the driver by displaying the information on the meter panel MP. For example, the meter panel MP turns on an indicator indicating the approach of the nearby vehicle, or displays characters indicating the approach of the vehicle on the display surface of the meter panel MP.

On the other hand, if the processing unit 641 determines that the input detection result from the sensing device 50 is an abnormal value or there is an obstacle within a predetermined distance, the processing unit 641 performs notification that encourages the driver to ask the passenger not to cover the sensing device 50. The predetermined distance can also be set at, for example, a distance at which the hand or the cloth of the passenger may wrap the sensing device 50. In this case, the processing unit 641 causes the meter panel MP to perform display in a form different from that of the basic processing described above. For example, the meter panel MP turns on an indicator different from that of the basic processing, or displays characters that encourage the passenger not to cover the sensing device 50. Thus, when the detection range A of the sensing device 50 is blocked by, for example, the hand or the cloth of the passenger, the driver is notified of this information, so it is possible to encourage the driver not to block the detection range A.

As another example of the form of notification to the driver, the vehicle 1 can further include a speaker (not shown) or the like, and this speaker or the like can generate an alarm sound in accordance with an instruction from the control unit 64. It is also possible to combine the indicator and the alarm sound. By generating the alarm sound by using the speaker or the like, it is possible to directly notify the passenger, instead of the driver, that the sensing device 50 is covered.

Effects of this Embodiment

According to this embodiment as explained above, the sensing device 50 is installed in the grip 40 having rigidity higher than those of, for example, the cowl and the fender, and this suppresses amplification of the vehicle vibration to be applied to the sensing device 50. Therefore, damage to the sensing device can be prevented.

Also, the sensing device 50 is installed in the rear end face. Since this reduces obstacles to detection, rear detection can easily be performed. In addition, since the sensing device 50 is installed in the rear end 401 of the grip 40, the passenger cannot easily grip the portion near the sensing device 50. This makes it possible to prevent the emission of an ultrasonic wave from being block by, for example, the hand or the cloth of the passenger.

Furthermore, since the sensing device 50 is arranged behind the rear end of the seat rear part 4b in the vehicle longitudinal direction, the passenger hardly grips the portion near the sensing device 50. Accordingly, it is possible to prevent the emission of an ultrasonic wave from being blocked by, for example, the hand or the cloth of the passenger.

Since the sensing device 50 is arranged in the recess 407, the sensing device 50 is not largely exposed and hence can be protected.

Moreover, since an ultrasonic wave emitted to the inner wall 408 of the recess 407 is reflected, the ultrasonic wave can be emitted to the target detection range. In addition, since the inner wall 408 decreases the emission angle of the ultrasonic wave, the ultrasonic wave is amplified, and the sensing performance improves.

Other Embodiments

The location of the sensing device is not limited to that of the abovementioned embodiment, and can also be another portion of the grip. For example, it is also possible to adopt an arrangement in which sensing devices are installed on the left and right side portions of the grip.

FIG. 8 is a plan view showing the layout of sensing devices according to another embodiment. A grip 400 includes recesses 407L and 407R that open backward from the left and right side parts of the vehicle 1, and sensing devices 50L and 50R are installed in the recesses 407L and 407R. The detection ranges of the sensing devices 50L and 50R are respectively LA and RA. In this arrangement, obstacles such as nearby vehicles can be detected not only in the back area but also in the side areas.

The grip 400 also includes first regions 405L and 405R, and second regions 406L and 406R having a shape different from that of the first regions 405L and 405R. The second regions 406L and 406R are so formed as to thicken toward the positions in which the sensing devices 50L and 50R are installed, from the front part to the rear part in the vehicle longitudinal direction. Consequently, the passenger hardly grips the second regions 406L and 406R, so it is possible to prevent the sensing devices 50L and 50R from being blocked by, for example, the hand or the cloth of the passenger.

FIG. 9 is a sectional view of a region B in FIG. 8, and shows the region B from above. The grip 400 is so formed as to include a hollow 56L inside. In addition, holes 400a and 54La are formed in the grip 40 and in a vibration damping member 54L so as to connect to the hollow 56L from the recess 407L. An electric harness 52L connected to the sensing device 50L extends to the hollow 56L through the holes 400a and 54La. Since the electric harness 52L thus extends inside the grip 400, the electric harness 52L is not exposed to the outside and hence can be protected. Note that the periphery of the sensing device 50R installed on the right side of the grip 400 can have the same arrangement.

Furthermore, a drain hole 410L can also be formed in the inner wall 408L of the recess 407L. When the drain hole 410 is formed, water inside the inner wall 408L flows through the drain hole 410L, so the drainage of the recess 407L can be improved. As in the abovementioned embodiment, the inner wall 408L can also include an inclined portion that inclines downward toward the opening of the recess 407. By forming the inclined portion that inclines downward on the inner wall 408 L, the drainage of the recess 407 can be improved. It is also possible to adopt an arrangement including both the inclined portion and the drain hole 410L.

The present invention is not limited to the above embodiments and various changes and modifications can be made within the spirit and scope of the present invention. Therefore, to apprise the public of the scope of the present invention, the following claims are made.

REFERENCE SIGNS LIST

1 . . . straddle type vehicle, 40 . . . grip, 50 . . . sensing device.

The invention claimed is:

1. A straddle type vehicle comprising:
a grip to be gripped by a passenger;
a sensing device configured to detect an obstacle around the vehicle by using an ultrasonic wave; and
an electric harness to be connected to the sensing device,
wherein the sensing device is arranged in the grip, and
wherein the electric harness is connected to the sensing device through an interior of the grip,
wherein the grip includes a recess that opens backward or sideward of the vehicle, and
wherein at least a part of the sensing device is arranged in the recess,
wherein at least a part of an inner wall of the recess extends backward more than the sensing device in the vehicle longitudinal direction,
wherein the inner wall has an inclined portion that inclines downward toward an opening of the recess.

2. The straddle type vehicle according to claim 1, wherein the sensing device is installed in a rear end of the grip in a vehicle longitudinal direction.

3. The straddle type vehicle according to claim 1, further comprising a seat on which the passenger sits,
wherein the grip includes a rear portion arranged behind a rear end of the seat in the vehicle longitudinal direction, and
the sensing device is arranged in the rear portion.

4. The straddle type vehicle according to claim 1, wherein the grip includes a first region, and a second region having a shape different from that of the first region, and the sensing device is arranged in the second region.

5. The straddle type vehicle according to claim 1, further comprising:
determining unit configured to determine whether an obstacle exists within a predetermined distance, from a detection result of the sensing device; and
notifying unit configured to notify a driver that the determining unit determines that the obstacle exists within the predetermined distance.

6. A straddle type vehicle comprising:
a grip to be gripped by a passenger;
a sensing device configured to detect an obstacle around the vehicle by using an ultrasonic wave; and
an electric harness to be connected to the sensing device,
wherein the sensing device is arranged in the grip, and
wherein the electric harness is connected to the sensing device through an interior of the grip,
wherein the grip includes a recess that opens backward or sideward of the vehicle, and
wherein at least a part of the sensing device is arranged in the recess,
wherein at least a part of an inner wall of the recess extends backward more than the sensing device in the vehicle longitudinal direction,
wherein a drain hole is formed in a lower portion of the inner wall.

7. A straddle type vehicle comprising:
a grip to be gripped by a passenger;
a sensing device configured to detect an obstacle around the vehicle by using an ultrasonic wave; and
an electric harness to be connected to the sensing device,
wherein the sensing device is arranged in the grip, and
wherein the electric harness is connected to the sensing device through an interior of the grip,
wherein the grip gradually thickens from an front part to the position where the sensing device is installed in the vehicle longitudinal direction.

* * * * *